Jan. 23, 1934.  E. D. KEELER  1,944,434
BAILER
Filed Nov. 7, 1932   2 Sheets-Sheet 1
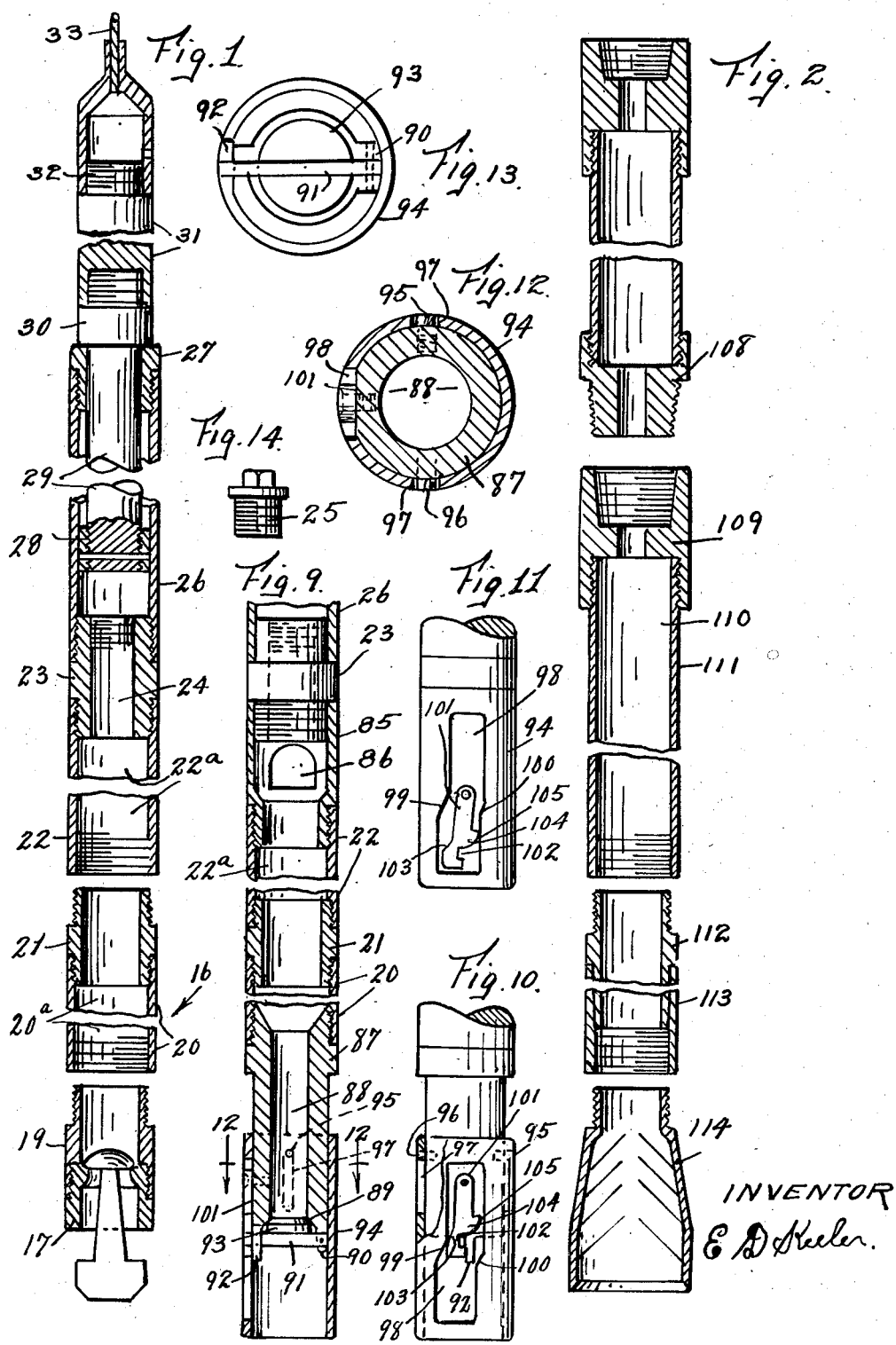
INVENTOR
E. D. Keeler.

Jan. 23, 1934.  E. D. KEELER  1,944,434
BAILER
Filed Nov. 7, 1932  2 Sheets-Sheet 2
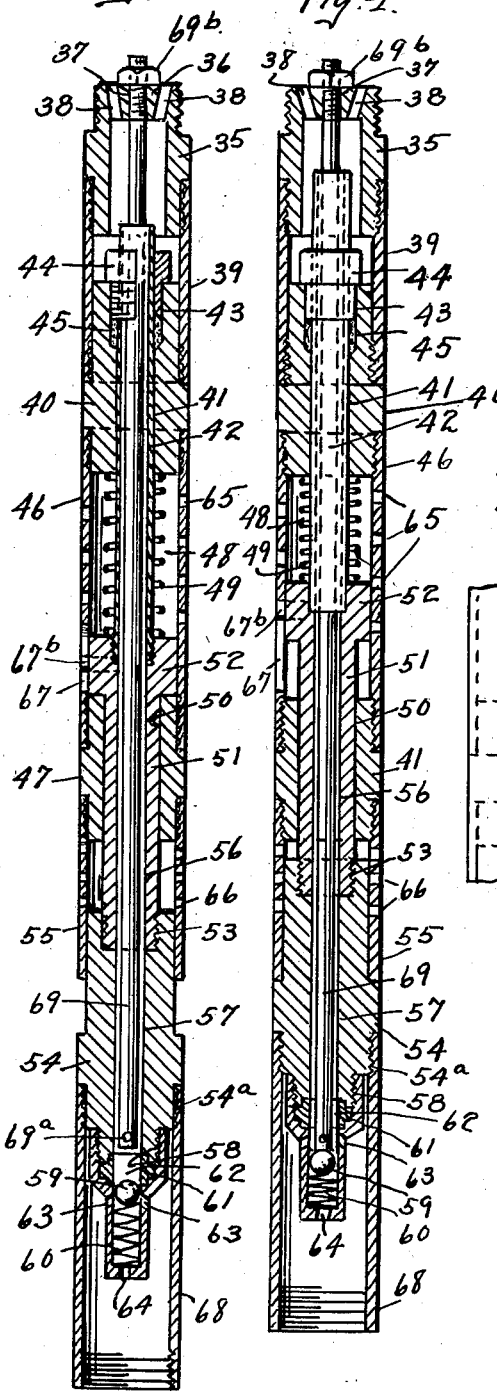
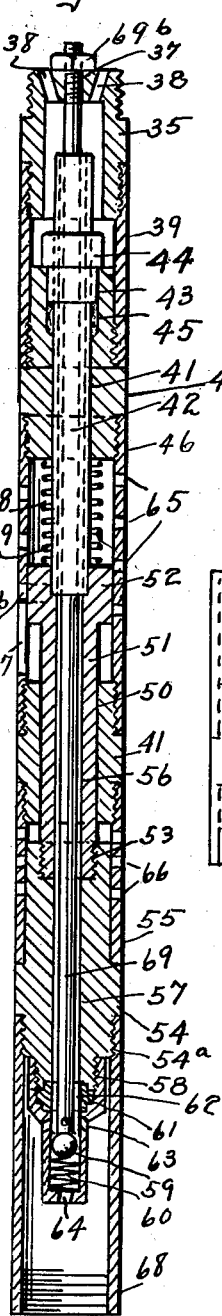
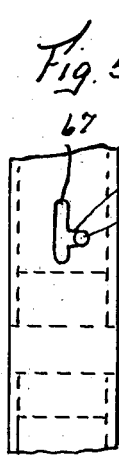
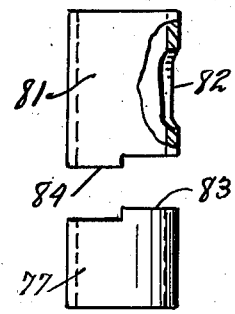
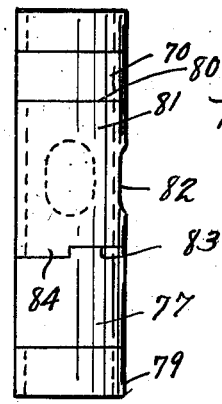
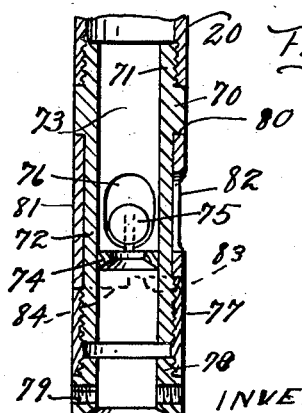
INVENTOR
E. D. Keeler.

Patented Jan. 23, 1934

1,944,434

UNITED STATES PATENT OFFICE 1,944,434

BAILER

Edgar D. Keeler, Long Beach, Calif.

Application November 7, 1932. Serial No. 641,550

9 Claims. (Cl. 166—19)

My invention relates primarily to a bailer for oil wells and the like and it has for its prime object the provision of a valve means capable of association therewith whereby the same may be used as a bailer, fishing tool, cement bailer and the like without the necessity of changing from one tool to another.

Another object is to provide mechanism of the above character which will be simple in construction and efficient in operation, and which will require a minimum amount of upkeep.

Other objects and advantages will appear hereinafter and, while I have shown and will describe the preferred form of my invention it will be understood that I do not limit myself to such preferred form but that various changes and adaptations may be made therein without departing from the spirit of my invention.

In the drawings accompanying and forming a part hereof:

Fig. 1 is a central longitudinal section, partly in elevation, of my device as adapted for a plain bailer.

Fig. 2 is a central longitudinal section through a rotary string as adapted for use as a fishing tool with the addition of my device.

Fig. 3 is a central longitudinal section, partly in elevation, of my valve mechanism, showing the same in its closed or inoperative position.

Fig. 4 is a similar view to Fig. 3, but showing the device in its open or operative position.

Fig. 5 is a fragmentary longitudinal elevation showing the means for locking the mechanism shown in Figs. 3 and 4 when used with a drill pipe.

Fig. 6 is a fragmentary central vertical section through a bottom arranged to be opened under pressure.

Fig. 7 is a side elevation of the parts shown in Fig. 6.

Fig. 8 is a detailed view showing the means of interlocking the parts shown in Figs. 6 and 7.

Fig. 9 is a central longitudinal section, partly in elevation, of my invention arranged as a cement bailer.

Fig. 10 is a side elevation, partly broken away, of the lower end of the mechanism shown in Fig. 9.

Fig. 11 is a side elevation of Fig. 10, but showing the mechanism in its opened position.

Fig. 12 is a section on the line 12—12 of Fig. 9.

Fig. 13 is a bottom plan of Fig. 9 on an enlarged scale.

Fig. 14 is a side elevation of a part of my device.

Referring to the drawings Fig. 1 illustrates a plain bailer consisting of the lower section 16, on the lower end of which is removably mounted the usual dart valve 17, by means of the sub 19. A section of tubular casing 20 connects the fitting or sub 19 to a coupling 21, and the other end of this coupling is connected by a tubing section 22 to one end of a sub 23. This sub 23 is provided with a hole 24 therethrough and the upper end of this hole is screw threaded for the reception of a screw threaded plug 25 as hereafter explained. The upper end of the sub 23 is screw threadedly connected to a tube section 26 which extends upwardly and has screw threadedly mounted in its upper end a fitting 27. Slidably mounted within the tubing 26 is a piston 28, which is rigidly mounted upon the lower end of a stem 29 and this stem extends upwardly and near its upper end is enlarged to form a collar 30 and is then reduced and screw threaded for the reception of the lower screw threaded end of the sinker 31. The other end of the sinker 31 is screw threadedly connected to the lower screw threaded end of the cable socket 32 within which is babbitted the end of the cable 33. The foregoing description covers a dart bailer equipped with "jars" as commonly used and no claim is made therefor excepting in combination with my device.

Referring to Figs. 3, 4 and 5, I have illustrated the prime feature of my invention by means of which the ordinary dart bailer as above described can be easily and and quickly changed over into a fluid pressure, or suction bailer.

35 indicates a sub the upper end of which is closed by a transverse partition 36 excepting at the center where it has provided therethrough an opening 37. A plurality of openings 38 are also provided through the partition 36 near the outer edge thereof. The ends of this sub 35 are exteriorly screw threaded the lower end is connected by a tube section 39 to the upper end of a sub 40. Sub 40 is provided with a central longitudinally extending opening 41 through which opening passes a tube 42. This tube 42 is of a size to snugly fit the opening 41 and the upper termination of said opening is enlarged and interiorly screw threaded to form a packing recess 43 the upper end of which is closed by an exteriorly screw threaded packing gland 44 and in the lower end of which is positioned the packing material 45. The lower end of the sub 40 is connected by a tube section 46 to the upper end of a sub 47 and forms, between the upper end of the sub 47 and the lower end of the sub 40, a spring chamber 48 within which is mounted the coil spring 49. Provided through the sub 47 is a central concentric opening 50 and slidably mounted in this opening is a stem 51 which terminates at its upper end within the chamber 48, in a head 52 against which the lower end of the spring 49 bears. The lower end of the stem 51 is screw threaded and is operatively mounted in a screw threaded opening or socket 53 provided concentrically in the upper end of the sub 54. The lower end of the sub 47 is screw threadedly connected to the upper end of a tube section 55 the lower end of which is slidably mounted to surround the upper end of the sub 54. A concentric opening 56 extends through the stem 51 from the lower termination of the socket 53 and is of a size corresponding to the interior of the tube 42, and a similar opening 57 is provided centrally of the sub 54. The lower end of the sub 54 is reduced in size and exteriorly screw threaded for the reception of the ball and spring cage 58 in which is mounted the ball check valve 59 and the coil spring 60. Removably mounted in the lower end of the opening 57 and within the cage 58 is a valve seat 61 having an opening 62 therethrough adapted to be closed by the ball valve 59. Extending through the walls of the cage 58 just below the seat 61 are a plurality of inlet openings 63. An opening 64 is provided in the bottom wall of the cage. Provided through the side wall of the tube section 46 are a plurality of holes 65, and provided through the side walls of the tube section 55 are a plurality of similar openings 66, these openings being for the purpose of allowing the escape of sand or other foreign material which may find its way therein. Formed in the side wall of the tube 46 is a substantially T-shaped slot 67 and projecting outwardly from the side of the head 52 is a pin 67b the projecting end of which is positioned within said slot 67, as best shown in Fig. 5, this construction providing means for locking the stem 51 and its head 52 against lengthwise movement relatively to sub 47 as will be hereafter explained. Sub 54 has a portion of the lower end thereof 54a, exteriorly screw threaded, for connection to the upper end of a tube section 68. The other end of the tube section 68 is interiorly screw threaded.

The opening 37 in the transverse partition 36 is screw threaded and rigidly, but removably mounted in this opening is the upper end of a tripping tube 69, a lock nut 69b is provided to lock said tube against accidental displacement in said partition. Tube 69 extends downwardly through the openings in the tube 42, the openings 56 and 57 in the stem 51 and sub 54 respectively and its lower end terminates at a distance above the ball 59, when the device is in its normal closed position. One or more openings 69a are provided in the side wall of tube 69 at its lower end, the purpose of which will be obvious.

In the use of my device in connection with the bailer illustrated in Fig. 1 the joint between the upper end of the sub 21 and the lower end of the tube 22 will be broken and the upper end of the sub 35 will be screwed into the lower end of the tube 22 and the upper end of the sub 21 will be screwed into the lower end of the tube 68 thus inserting my mechanism between the upper and lower sections of the bailer. The plug 25 will then be operatively positioned within the upper end of the opening 24 making the upper section air tight. The joint between the sub 19 and the tube 20 will be broken and sub 19 with its dart valve 17 removed, and a bailer bottom of the type shown in Fig. 6 substituted therefor.

As best shown in Figs. 6, 7 and 8 this bottom comprises a sub 70 having a short upper end 71 and a long lower end 72, this short upper end being adapted to be screwed into the lower end of the tube 20. An opening 73 extends centrally through said sub 70 and mounted in this opening about midway of the length of the sub 70 is a valve seat 74 provided with a coacting flap valve 75, said valve opening upwardly. Provided in the side wall of this sub 70 immediately above the valve seat 74 is an opening 76. The lower end of the long lower end 72 of the sub 70 is exteriorly screw threaded and has mounted thereon the upper end of a coupling sleeve 77 in the lower end of which is positioned a shoe 78. Provided through the side walls of the shoe 78 near the lower end thereof are a plurality of interiorly screw threaded openings 79 provided for the insertion of reducing bushings when it is desired to vary the size of the same. The upper end of the coupling sleeve 77 and the lower end of the sub are threaded left handed for a purpose to be hereafter explained.

Snugly mounted upon the longer end of the sub 70, between the lower edge of the projection or collar 80 and the upper edge of the coupling sleeve 77 is a section 81 in the side wall of which is provided an opening 82 of a size and configuration similar to the opening 76 in the sub 70 and adapted to be brought into register with the same when it is desired to unload the bailer. As best shown in Figs. 7 and 8 the abutting edges of the coupling sleeve 77 and the section 81 are provided with reversed offset portions 83 and 84 so that said sleeve and section are interlocked together so as to rotate in unison only and tending to prevent accidental registering of the openings 76 and 82.

In the operation of this arrangement the parts will normally be in the positions shown in the drawings with the exception that the piston 28 will be at the upper end of its stroke and bearing against the under side of the fitting 27, with my mechanism in the position shown in Fig. 3. The tool will be lowered down the well and as the shoe 78 comes to rest upon the bottom of the well further descent of that portion of the device united thereto will be prevented, for instance the sub 70 and its associated parts, the tube 68, the sub 54 and the stem 51 with the head 52 will cease further downward movement, while the tube 55 and its associated parts will continue to descend until the lower edge thereof contacts with the upper edge of the sub shoulder on sub 54, (see Fig. 4).

This further downward movement will bring the lower end of the tube 69 into contact with the ball valve 59 and move the same downwardly off of its seat. Fluid in the well will now be free to flow through the openings 63 and through the openings 62, 69a, through the interior of tube 69 and through the openings 56, 57 and the interior of tube 42 and out through the openings 38 and then into the chamber 22a. As the fluid flows into the device as above described the air therein will be compressed and forced into the upper end of the said chamber 22a. When the device is drawn upwardly the valve 75 closes the opening through the seat 74 and the ball valve is returned to its seat by the spring 60, it being seen that the initial upward movement of the device withdraws the tube 69 upward to its original position shown in Fig. 3, and the fluid within the device is trapped. The device is drawn to the surface and either the sleeve 81 or the coupling 77 is rotated to the right to bring the openings 76 and 82 into register when the fluid will be free to flow therethrough together with any other foreign material such as sand or the like, the air compressed in the chamber acting to force the said material through said opening to atmosphere. In the event it is seen that the device does not advance during succeeding lowerings it may be raised and lowered as many times as desired without removing the same from the well as the valve will automatically open and close as the device is set down or drawn up.

In Figs. 9, 10, 11, 12 and 13 I have shown a bottom devised for use with the bailer shown in Fig. 1, for lowering fluid or plastic material into the well and dumping the same on the bottom. This bottom comprises a sub 85 inserted between the sub 23 and the tube 22. This sub 85 has provided through its side wall an opening 86 through which fluid or plastic material is poured into the chamber 22a and 20a. A sub 87 is substituted for the sub 19 and dart valve 17 on the lower end of tube 20. This sub 87 is provided with a concentric opening 88 therethrough the lower end of which terminates in a valve seat 89. Projecting downwardly from the lower end of the sub 87 is a projection 90 which is bifurcated and pivotally mounted between the furcations thereof is one end of a bar 91, this bar being of a length to extend across the bottom of the sub and have its free end project a short distance beyond the opposite side thereof. A projection 92 projects downwardly from the sub 87 on the opposite side to the projection 90 against the side of which the side of the bar 91 lays. Rigidly mounted upon the upper edge of the bar 91 is a valve 93 adapted for closing the opening through the sub by engaging the valve seat 89. Slidably and non-rotatably mounted upon the outer periphery of the lower portion of the sub 87 and surrounding the same is a sleeve 94 held positioned by means of pins 95 and 96 projecting outwardly from the walls of said sub and projecting into longitudinal slots 97 in the wall of said sleeve.

Formed through the side wall of the sleeve 94 at a point midway between the slots 97 is a longitudinally extending opening 98 the ends of which are offset relative to each other and abutting ends being connected by cam portions 99 and 100.

Pivotally mounted at its upper end within the opening 98 is a latch 101 in the lower end of which is formed a recess 102 for the reception of the projecting end of the rod or bar 91 to hold the valve 93 upon its seat 89. Formed in the edge of this latch 101 opposite the recess 102 is an angular cam portion 103 adapted for engagement with the cam portion 99 of the opening 98. Formed on the ends of the latch 101 opposite the portion 103 is a projecting nose 104 the outer face 105 of which forms a cam portion for engagement with the cam portion 100. The object of the foregoing construction is that when the device is descending into the well the sleeve 94 is at its lowermost or extended position (see Figs. 9 and 10) and the cam portion 99 is in contact with the cam portion 103 and acting to hold the latch in its innermost position and in engagement with the projecting end of the bar 91 holding the valve 93 seated. As the lower end of the sleeve 94 contacts with the bottom, further descent thereof is prevented and is caused to slide upwardly relative to the sub 87 thus bringing the cam portion 105 into contact with the cam portion 100, at the same time withdrawing the cam portion 99 from contact with the cam portion 103 thus rocking said latch on its pivot and releasing the end of the bar 91 when the valve 93 is free to swing downwardly from its seat and permit the contents of the bailer to dump.

In Fig. 2 I have shown a rotary drill string equipped at its lower end with a basket or other suitable fishing device. In order to equip this construction with my device the tool joint between the upper and lower or pin and box members 108 and 109 respectively and a solid sub inserted therebetween, thus making the chamber 110 within tube 111 air tight. The upper end of the sub 35 is screwed into the lower end of tube 111, and the lower end of the tube 68 is screwed onto the upper end of the sub 112. The lower end of the sub 112 is connected by a tube 113 to the upper end of a fishing basket 114 or other suitable or desired fishing device.

In the event it is desired to lock the mechanism against tripping during its downward travel (when used with drill pipe) the device will be compressed lengthwise slightly so as to place a tension upon the spring 49. The upper section will then be rotated until the pin 67b is positioned within the offset portion 67a of the slot 67 when the parts will be locked against relative lengthwise movement. When the bottom has been reached and it is desired to permit the mechanism to function, a slight rotation in the direction of drilling will move the pin 68 out of the offset 67a and into the slot 67 and the device will be free to function.

Having described my invention what I claim is:

1. In an apparatus of the character described, a valve mechanism for connection at an intermediate point in a drill string and comprising relatively telescopic tubular members, an air and fluid tight chamber in the drill string above said valve mechanism, a valve at the lower end of the lowermost of said telescopic members, a fluid passage thru both of said members extending from said valve to said chamber, said valve opening downwardly and being adapted to close the lower end of said passage to prevent passage of fluid therethru, means carried by the uppermost of said telescopic members adapted upon relative telescopic movement of said members to open said valve and permit passage of fluid into said chamber.

2. In an apparatus of the character described, a valve mechanism for connection at an intermediate point in a drill string and comprising relatively telescopic tubular members, an air and fluid tight chamber in the drill string above said valve mechanism, a valve at the lower end of the lowermost of said telescopic members, a fluid passage thru both of said members extending from said valve to said chamber, said valve opening downwardly and being adapted to close the lower end of said passage to prevent passage of fluid therethru, means carried by the uppermost of said telescopic members adapted upon relative telescopic movement of said members to open said valve and permit passage of fluid into said chamber, and means for normally holding said telescopic members in an extended position.

3. In a bailer comprising tubular members, means slidably mounting said members each to the other, a valve at the lower end of the lowermost of said slidably mounted members, said members having a fluid passage therethru, said valve opening downwardly and being adapted to close the lower end of said passage to prevent passage of fluid therethru, an unseating tube mounted in the uppermost of said slidably mounted members, said unseating tube extending thru said fluid passage, said tube being adapted to engage and unseat the valve on downward movement of the uppermost of said slidably mounted members.

4. In a bailer comprising tubular members, means slidably mounting said members each to the other, a valve at the lower end of the lowermost of said slidably mounted members, said members having a fluid passage therethru, said valve opening downwardly and being adapted to close the lower end of said passage to prevent passage of fluid therethru, an unseating tube mounted in the uppermost of said slidably mounted members, said unseating tube extending thru said fluid passage, said tube being adapted to engage and unseat the valve on downward movement of the uppermost of said slidably mounted members, and releasable means on said slidably mounted members whereby they are normally held in extended position.

5. In a bailer comprising tubular members, means slidably mounting said members each to the other, a valve at the lower end of the lowermost of said slidably mounted members, said members having a fluid passage therethru, said valve opening downwardly and being adapted to close the lower end of said passage to prevent passage of fluid therethru, an unseating tube mounted in the uppermost of said slidably mounted members, said unseating tube extending thru said fluid passage, said tube being adapted to engage and unseat the valve on downward movement of the uppermost of said slidably mounted members, and spring means between said slidably mounted members whereby said members are urged apart.

6. In a bailer comprising tubular members, means slidably mounting said members each to the other, a valve at the lower end of the lowermost of said slidably mounted members, said members having a fluid passage therethru, said valve opening downwardly and being adapted to close the lower end of said passage to prevent passage of fluid therethru, an unseating tube mounted in the uppermost of said slidably mounted members, said unseating tube extending thru said fluid passage, said tube being adapted to engage and unseat the valve on downward movement of the uppermost of said slidably mounted members, a bottom sub mounted below said lowermost slidably mounted member, an upwardly opening valve in said sub, a section journaled on said sub, said section having an opening therein, said sub having an opening therein, both of said openings being adapted to be brought into registry upon rotation of said section whereby the bailer is unloaded.

7. In a bailer comprising tubular members, means slidably mounting said members each to the other, a valve at the lower end of the lowermost of said slidably mounted members, said members having a fluid passage therethru, said valve opening downwardly and being adapted to close the lower end of said passage to prevent passage of fluid therethru, an unseating tube mounted in the uppermost of said slidably mounted members, said unseating tube extending thru said fluid passage, said tube being adapted to engage and unseat the valve on downward movement of the uppermost of said slidably mounted members, and releasable means on said slidably mounted members whereby they are normally held in extended position, a bottom sub mounted below said lowermost slidably mounted member, an upwardly opening valve in said sub, a section journaled on said sub, said section having an opening therein, said sub having an opening therein, both of said openings being adapted to be brought into registry upon rotation of said section whereby the bailer is unloaded.

8. In an apparatus of the character described, a valve mechanism for connection at an intermediate point in a drill string and comprising relatively telescopic tubular members, an air and fluid tight chamber in the drill string above said valve mechanism, a valve at the lower end of the lowermost of said telescopic members, a fluid passage thru both of said members extending from said valve to said chamber, said valve opening downwardly and being adapted to close the lower end of said passage to prevent passage of fluid therethru, means carried by the uppermost of said telescopic members adapted upon relative telescopic movement of said members to open said valve and permit passage of fluid into said chamber, a bottom sub mounted below said lowermost slidably mounted member, an upwardly opening valve in said sub, a section journaled on said sub, said section having an opening therein, said sub having an opening therein, both of said openings being adapted to be brought into registry upon rotation of said section whereby the bailer is unloaded.

9. In an apparatus of the character described, a valve mechanism for connection at an intermediate point in a drill string and comprising relatively telescopic tubular members, an air and fluid tight chamber in the drill string above said valve mechanism, a valve at the lower end of the lowermost of said telescopic members, a fluid passage thru both of said members extending from said valve to said chamber, said valve opening downwardly, and being adapted to close the lower end of said passage to prevent passage of fluid therethru, means carried by the uppermost of said telescopic members adapted upon relative telescopic movement of said members to open said valve and permit passage of fluid into said chamber, and means for normally holding said telescopic members in an extended position, a bottom sub mounted below said lowermost slidably mounted member, an upwardly opening valve in said sub, a section journaled on said sub, said section having an opening therein, said sub having an opening therein, both of said openings being adapted to be brought into registry upon rotation of said section whereby the bailer is unloaded.

EDGAR D. KEELER.